United States Patent
Moon (10) Patent No.: US 11,880,496 B2
(45) Date of Patent: Jan. 23, 2024

(54) MITIGATING AGAINST A PERSISTENT CONSISTENT THREAT IN A NETWORK DEVICE BASED ON REDUCING TEMPORAL SURFACE AREA

(71) Applicant: WhiteStar Communications, Inc., Durham, NC (US)

(72) Inventor: Billy Gayle Moon, Apex, NC (US)

(73) Assignee: WhiteStar Communications, Inc., Durham, NC (US)

( * ) Notice: Subject to any disclaimer, the term of this patent is extended or adjusted under 35 U.S.C. 154(b) by 121 days.

(21) Appl. No.: 17/714,647

(22) Filed: Apr. 6, 2022

(65) Prior Publication Data

US 2023/0325539 A1    Oct. 12, 2023

(51) Int. Cl.
| | | |
|---|---|---|
| *G06F 21/79* | (2013.01) | |
| *G06F 21/56* | (2013.01) | |
| *G06F 21/54* | (2013.01) | |
| *G06F 21/55* | (2013.01) | |

(52) U.S. Cl.
CPC ............... *G06F 21/79* (2013.01); *G06F 21/54* (2013.01); *G06F 21/554* (2013.01); *G06F 21/565* (2013.01)

(58) Field of Classification Search
CPC ......... G06F 21/79; G06F 21/56; G06F 21/566
See application file for complete search history.

(56) References Cited

U.S. PATENT DOCUMENTS

| | | | | |
|---|---|---|---|---|
| 7,373,666 | B2 * | 5/2008 | Kaler | G06F 21/554 |
| | | | | 709/224 |
| 7,571,475 | B2 * | 8/2009 | Moon | G06F 21/71 |
| | | | | 726/22 |
| 9,342,691 | B2 * | 5/2016 | Maestas | G06F 21/577 |
| 10,977,368 | B1 * | 4/2021 | Ciubotariu | G06F 21/554 |
| 11,176,276 | B1 * | 11/2021 | Chen | G06F 21/54 |
| 11,231,988 | B1 * | 1/2022 | Neustrom | G06F 11/0721 |
| 2015/0067865 | A1 * | 3/2015 | Seacat Deluca | G06F 21/554 |
| | | | | 726/25 |

(Continued)

FOREIGN PATENT DOCUMENTS

| | | | | |
|---|---|---|---|---|
| EP | 2141626 A1 * | 1/2010 | | G06F 21/55 |
| EP | 2223253 B1 * | 1/2018 | | G06F 21/554 |

OTHER PUBLICATIONS

Wikipedia, "Pegasus (spyware)", Mar. 23, 2022, [online], [retrieved on Mar. 28, 2022]. Retrieved from the Internet: URL: <https://en.wikipedia.org/w/index.php?title=Special:DownloadAsPdf&page=Pegasus_%28spyware%29&action=show-download-screen>, pp. 1-24.

(Continued)

*Primary Examiner* — Ponnoreay Pich
(74) *Attorney, Agent, or Firm* — Leon R. Turkevich (57) ABSTRACT

In one embodiment, a method comprises: determining, by an executable resource within a network device, a risk of the network device having been infected by a persistent consistent threat based on the executable resource detecting attributes associated with the network device; and presenting based on the risk, by the executable resource, a recommendation to a user of the network device to execute a prescribed hard reset that erases all data and executable code from a volatile random access memory (RAM) of the network device, the prescribed hard reset causing erasure of any persistent consistent threat residing in the volatile RAM.

17 Claims, 3 Drawing Sheets

(56) References Cited

U.S. PATENT DOCUMENTS

| | | | |
|---|---|---|---|
| 2019/0050297 A1* | 2/2019 | Mondello | G06F 21/79 |
| 2019/0332766 A1* | 10/2019 | Guri | G06F 21/565 |
| 2020/0327255 A1* | 10/2020 | Ngo | G06F 21/577 |
| 2021/0081524 A1 | 3/2021 | Moon | |
| 2023/0096182 A1* | 3/2023 | Castrejon, III | G06F 21/554 |
| | | | 726/22 |
| 2023/0325539 A1* | 10/2023 | Moon | G06F 21/54 |
| | | | 726/22 |

OTHER PUBLICATIONS

Moon, U.S. Appl. No. 17/343,268, filed Jun. 9, 2021.
Moon et al., U.S. Appl. No. 17/496,164, filed Oct. 7, 2021.

* cited by examiner

MITIGATING AGAINST A PERSISTENT CONSISTENT THREAT IN A NETWORK DEVICE BASED ON REDUCING TEMPORAL SURFACE AREA

TECHNICAL FIELD

The present disclosure generally relates to mitigating against a persistent consistent threat in a network device based on reducing a temporal surface area.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

"Spyware" has become a substantial security concern for network devices connected to an unsecured local and/or wide area network such as the Internet. Spyware can attack a network device based on "mining" data generated and/or stored on the network device, mining network device activity (including user activity such as password entry), and forwarding the mined data and user activity to a remote destination for potential malicious use.

A particularly severe threat that has evaded anti-spyware systems is "Pegasus". Pegasus is a spyware program developed by an Israeli company. Pegasus can spy on a user's network device (e.g., a smartphone) using "zero-click" exploits that can initiate spying once "pushed" onto the network device. Pegasus can be pushed onto a network device using a zero-day exploit and/or commercially-available messaging applications such as "WhatsApp", "Signal", or SMS messaging that can send content to the network device without user authorization.

Pegasus, once resident on a network device, can gain root access to the network device, enabling Pegasus to access stored data and input/output data, including device keyboard inputs, device camera images and sound, microphone data, file systems, browser history, device location data (e.g., GPS data), etc. Pegasus can then send the accessed data to a remote destination that can maliciously exploit the user based on the accessed data.

A particular feature of Pegasus is that it never stores its executable code in a non-volatile storage medium such as "flash" memory on the network device; rather, Pegasus is able to store itself in a volatile random access memory (RAM) that is normally reserved by a memory management unit (MMU) as "protected memory" for a "root process" (or "kernel") on the network device; further, any spy detection software is not permitted access to the protected memory. Hence, Pegasus is referred to as a "persistent consistent threat" that cannot be detected by any spyware detection software.

Hence, there is no known method for verifying the presence of a persistent consistent threat such as Pegasus within the protected memory in volatile RAM of a network device.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises: determining, by an executable resource within a network device, a risk of the network device having been infected by a persistent consistent threat based on the executable resource detecting attributes associated with the network device; and presenting based on the risk, by the executable resource, a recommendation to a user of the network device to execute a prescribed hard reset that erases all data and executable code from a volatile random access memory (RAM) of the network device, the prescribed hard reset causing erasure of any persistent consistent threat residing in the volatile RAM.

In another embodiment, one or more non-transitory tangible media are encoded with logic for execution by a machine and when executed by the machine operable for: determining, by the machine implemented as a network device, a risk of the network device having been infected by a persistent consistent threat based on detecting attributes associated with the network device; and presenting, based on the risk, a recommendation to a user of the network device to execute a prescribed hard reset that erases all data and executable code from a volatile random access memory (RAM) of the network device, the prescribed hard reset causing erasure of any persistent consistent threat residing in the volatile RAM.

In another embodiment, an apparatus is implemented as a physical machine. The apparatus comprises: a volatile random access memory (RAM); non-transitory machine readable media configured for storing executable machine readable code; a device interface circuit configured for communications with a data network; and a processor circuit. The processor circuit is configured for executing the machine readable code, and when executing the machine readable code operable for: determining a risk of the apparatus having been infected by a persistent consistent threat based on detecting attributes associated with the apparatus; and presenting, based on the risk, a recommendation to a user of the apparatus to execute a prescribed hard reset that erases all data and executable code from the volatile RAM, the prescribed hard reset causing erasure of any persistent consistent threat residing in the volatile RAM.

DETAILED DESCRIPTION

Figure 1:
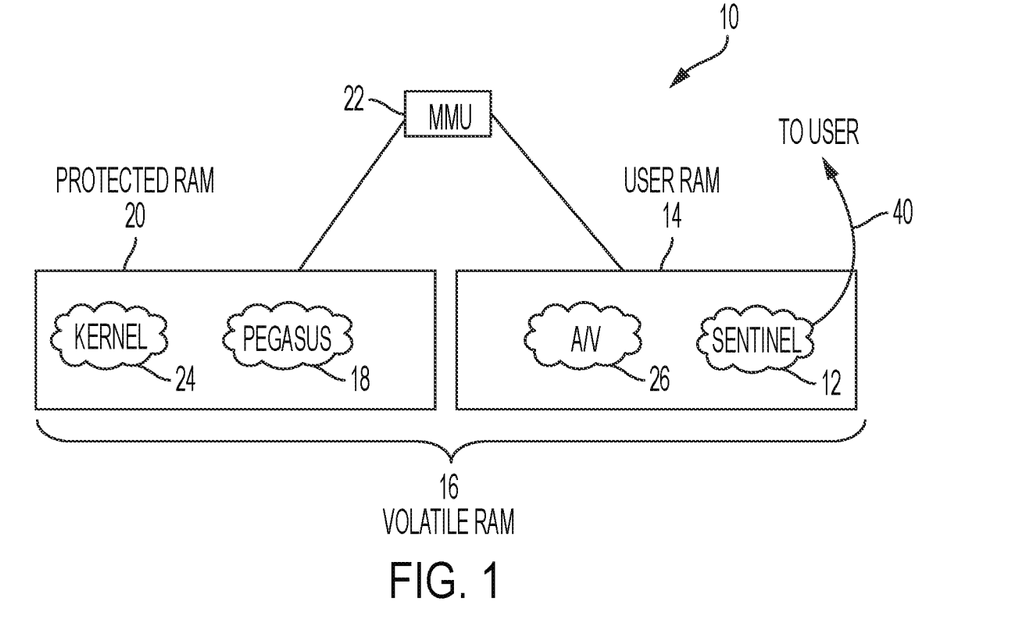
FIG. 1 illustrates an example apparatus configured for mitigating against a persistent consistent threat based on reducing a temporal surface area of the apparatus, according to an example embodiment.

FIG. 1 illustrates an example network device 10 comprising an executable resource 12, executed within a user portion 14 of a volatile random access memory (RAM) 16, for mitigating against a persistent consistent threat 18 executed within a "protected memory" 20 of the network device 10, according to an example embodiment. Particular embodiments enable the executable resource 12, referred to herein as the "sentinel" resource 12 or the executable threat detection resource 12, to mitigate against the persistent consistent threat (e.g., Pegasus) 18 having infected the network device 10, even though the persistent consistent threat (e.g., Pegasus) 18 can reside within the protected RAM 20 that is reserved by a memory management unit (MMU) 22 for a "root process" (i.e., "kernel" operating system) 24 of the network device 10.

As described below, the executable sentinel resource 12 can mitigate against the persistent consistent threat (e.g., Pegasus) 18 based on presenting to a user of the network device 10 a recommendation to initiate execution of a "hard" reset of the network device 10. Execution of a hard reset by the operating system of the network device 10 erases all data and executable code that is stored in the volatile RAM 16 that includes the protected RAM 20. Hence, execution of a hard reset can remove any persistent consistent threat (e.g., Pegasus) 18 residing in the volatile RAM 16 comprising the user portion 14 and the protected RAM 20.

As described previously, a persistent consistent threat (e.g., Pegasus) 18 cannot be detected by any spyware detection/antivirus (AV) software 26 because the persistent consistent threat (e.g., Pegasus) 18 is stored in the protected RAM 20 in the volatile RAM 16 that is reserved for the root process 24 of the network device 10. Spyware detection software 26 is only granted access to "user" memory space 14, i.e. memory locations that are reserved by the MMU 22 for user access and separate from the protected memory 20 of the root process 24. Hence, no spyware detection software 26 is granted access by the MMU 22 to the protected RAM 20.

Hence, although spyware detection software 26 can scan for suspicious virus/spyware activity in the "user" portion 14 of volatile RAM 16, and non-volatile memory (NVRAM) (38 of FIG. 2) such as "flash" memory or disk memory, the spyware detection software 26 is not permitted by the MMU 22 to scan the protected memory 20 in which the persistent consistent threat (e.g., Pegasus) 18 resides (any attempt by any unauthorized executable process to access the protected memory 20 would be automatically shut down by the MMU 22 to protect the integrity of the executable kernel 24).

Figure 2:
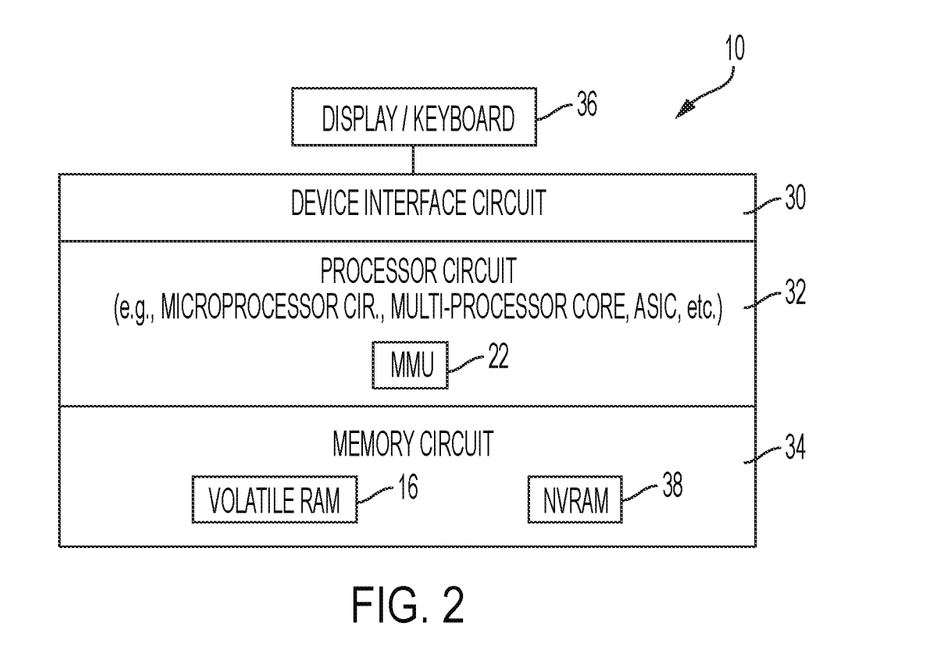
FIG. 2 illustrates in different detail the network device of FIG. 1, according to an example embodiment.

Hence, there is no known method for directly identifying (i.e., verifying) the presence of a persistent consistent threat 18 such as Pegasus within the protected memory 20 in volatile RAM 16 of a network device 10, let alone any method for eradicating the protected RAM 20 during runtime execution of the executable kernel 24 and the spyware detection/AV software 26 by a processor circuit (32 of FIG. 2). Hence, the persistent consistent threat (e.g., Pegasus) 18 is capable of spying on user activity or stored data structures and reporting the spying activity to unknown (and possibly malicious) destinations via a data network such as the Internet.

Commercially-available executable encryption resources (e.g., the secure messaging app "Society" and the secure keyboard app "KeyP") from WhiteStar Communications, Durham, North Carolina enable localized encryption of "at-rest" and "in-flight" data structures to prevent any spying by an executable resource such as Pegasus 18. For example, the messaging app "Society" can prevent spying by Pegasus based on "Society" executing localized encryption of data structures prior to secure local storage or secure transmission on a secure data network, described for example in commonly-assigned, copending application Ser. No. 17/343, 268, filed Jun. 9, 2021, entitled "IDENTITY MANAGEMENT SYSTEM ESTABLISHING TWO-WAY TRUSTED RELATIONSHIPS IN A SECURE PEER-TO-PEER DATA NETWORK". The secure keyboard app "KeyP" provides a secure keyboard that can prevent spying on user keystrokes, described for example in commonly-assigned, copending application Ser. No. 17/496,164, filed Oct. 7, 2021, entitled "SECURE KEYBOARD RESOURCE LIMITING ACCESS OF USER INPUT TO DESTINATION RESOURCE REQUESTING THE USER INPUT".

Despite the availability of the above-described executable encryption resources (e.g., "Society" and "KeyP") that enable localized encryption, however, a persistent consistent threat 18 such as Pegasus still can access unencrypted data that is not within the "sphere" or control of the executable encryption resources. Hence, any unencrypted data that is "outside" the control of the executable encryption resources is still subject to spying by a persistent consistent threat such as Pegasus.

According to example embodiments, an attack by a persistent consistent threat (e.g., Pegasus) 18 within a network device 10 can be mitigated based on forcing the executable code of the persistent consistent threat (e.g., Pegasus) 18 to be erased from the volatile random access memory (RAM) 16 of the persistent consistent threat (e.g., Pegasus) 18. The persistent consistent threat (e.g., Pegasus) 18 can be erased based on causing the executable operating system of the network device 10 to execute a hard reset that erases all data and executable code from its volatile RAM 16. Since the execution of a hard reset erases all data and executable code from a volatile RAM 16, the hard reset can erase the persistent consistent threat 18 such as Pegasus from the volatile RAM 16.

Existing reboot techniques do not address notifying a user to execute a hard reset or "hard" reboot to mitigate against a persistent consistent threat (e.g., Pegasus) 18. For example, a desktop operating system of a network device 10 can install a software package, and as part of the installation process permit a reboot of the network device 10 in order to patch the kernel 24 with updated executable code; however, the restart that is executed as part of the software package installation is a "soft" reboot that does not clear the volatile RAM memory 16. Hence, a desktop operating system does not execute a "hard" reboot as part of a software installation, and does not recommend that a user executes a "hard" reboot.

Similarly, a smart device (e.g., a smart phone) does not execute any "soft" reboot or "hard" reboot in response to installation of an executable application ("app") on the smart device. A hard reboot is only performed automatically in response to a device operating system update, where the hard reboot is a mandatory part of the device operating system update. Hence, a user is never prompted to perform a hard reboot as part of a device operating system update, neither is the user ever provided any recommendation to execute a hard reboot to remove a persistent consistent threat (e.g., Pegasus) 18.

Hence, the example embodiments can determine a risk of the network device 10 having been infected by a persistent consistent threat (e.g., Pegasus) 18 based on detecting attributes associated with the network device 10, and based on the determined risk generate and present to a user of the network device 10 a recommendation 40 to execute a hard reset that erases all data and all executable code (including the persistent consistent threat (e.g., Pegasus) 18) from the protected RAM 20 of the volatile RAM 16.

Another particular feature of the example embodiments is that many users are unaware of how to execute a hard reset that erases all data and executable code from a volatile RAM 16; in particular, a user may be only familiar with executing a "soft" reset that does not clear the volatile RAM 16. Hence, the example embodiments also can provide instructions on how to execute a hard reset for the network device 10; the example embodiments also can supply a notification or recommendation for executing the hard reset, for example based on detected device conditions, user operations, etc.

Hence, the example embodiments can reduce a "temporal" surface area of a network device by reducing the time that the network device (e.g., user device such as a smart phone, smart tablet, personal computer, etc.) stores executable code or data in its volatile RAM 16.

FIG. 2 is a diagram illustrating in different detail the network device 10, according to an example embodiment. The apparatus 10 is a physical machine (i.e., a hardware device) configured for implementing network communications with other physical machines (not shown) via a wired or wireless data network (not shown). The term "configured for" or "configured to" as used herein with respect to a specified operation refers to a device and/or machine that is physically constructed and arranged to perform the specified operation. Hence, the apparatus 10 can be implemented as a network-enabled user machine providing user access to a data network, and/or a machine (e.g., an Internet of Things (IoT) enabled network device, a switching device or router device, a server device, etc.).

The apparatus 10 can include a device interface circuit 30, a processor circuit 32, and a memory circuit 34. The network device 10 also can optionally include a device display and/or keyboard 36, depending on implementation, described below.

The device interface circuit 30 can include one or more distinct physical layer transceivers for communication with any other network device (not shown); the device interface circuit 30 also can include an IEEE based Ethernet transceiver for communications with other network devices via any type of data link (e.g., a wired or wireless link, an optical link, etc.).

The processor circuit 32 can be configured for executing any of the operations described herein, and comprises the MMU 22 of FIG. 1. The memory circuit 34 comprises the volatile RAM 16 of FIG. 1, and a NVRAM 38; the memory circuit 34 can be configured for storing any data or data packets as described herein.

Any of the disclosed circuits of the network device 10 (including the device interface circuit 30, the processor circuit 32, the memory circuit 34, the device display and/or keyboard 36, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory (e.g., in the volatile RAM 16), creating an executable application resource (e.g., an application instance or a corresponding instance of the executable kernel 24, the executable sentinel resource 12, the spyware detection/AV software 26, etc.) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit.

The processor circuit 32 also can comprise the volatile RAM 16 or any portion thereof, depending on implementation as appropriate.

The memory circuit 34 can be implemented, for example, using a non-volatile memory 38 such as a programmable read only memory (PROM) or an EPROM, and a volatile memory 16 such as a DRAM, etc.

Any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 3:
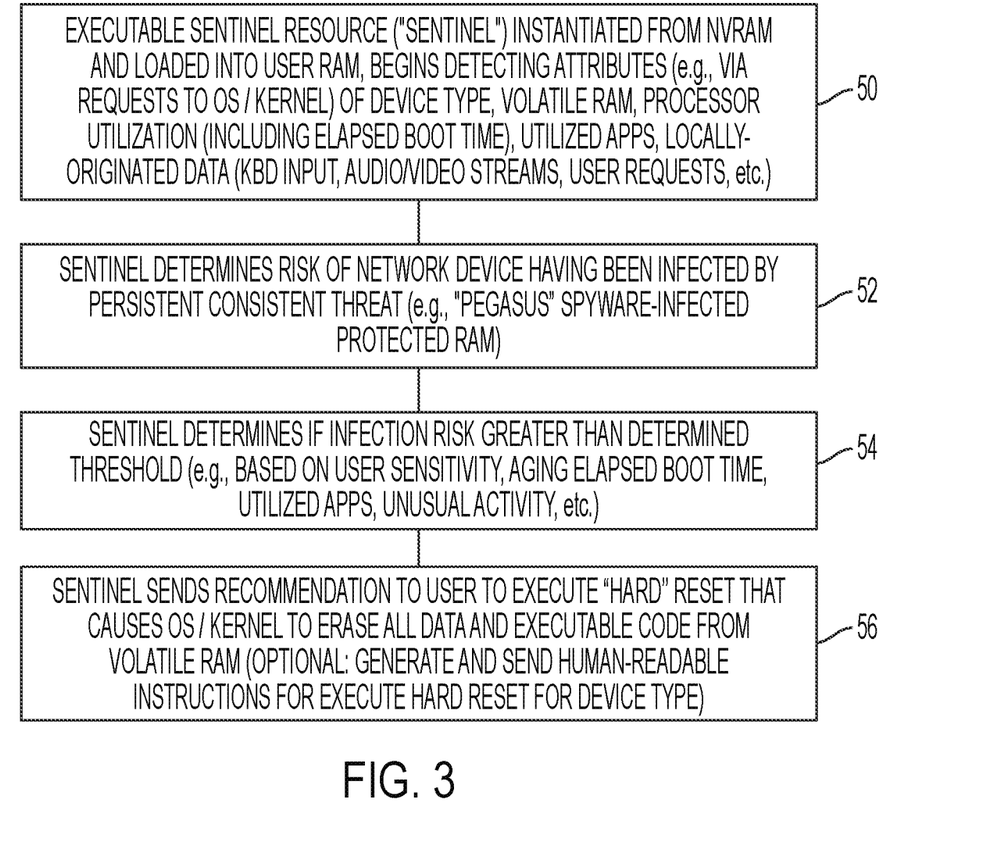
FIG. 3 illustrates an example method of mitigating against a persistent consistent threat based on reducing a temporal surface area of a network device, according to an example embodiment.

FIG. 3 illustrates an example method of mitigating against a persistent consistent threat based on reducing a temporal surface area of a network device, according to an example embodiment.

Figure 4:
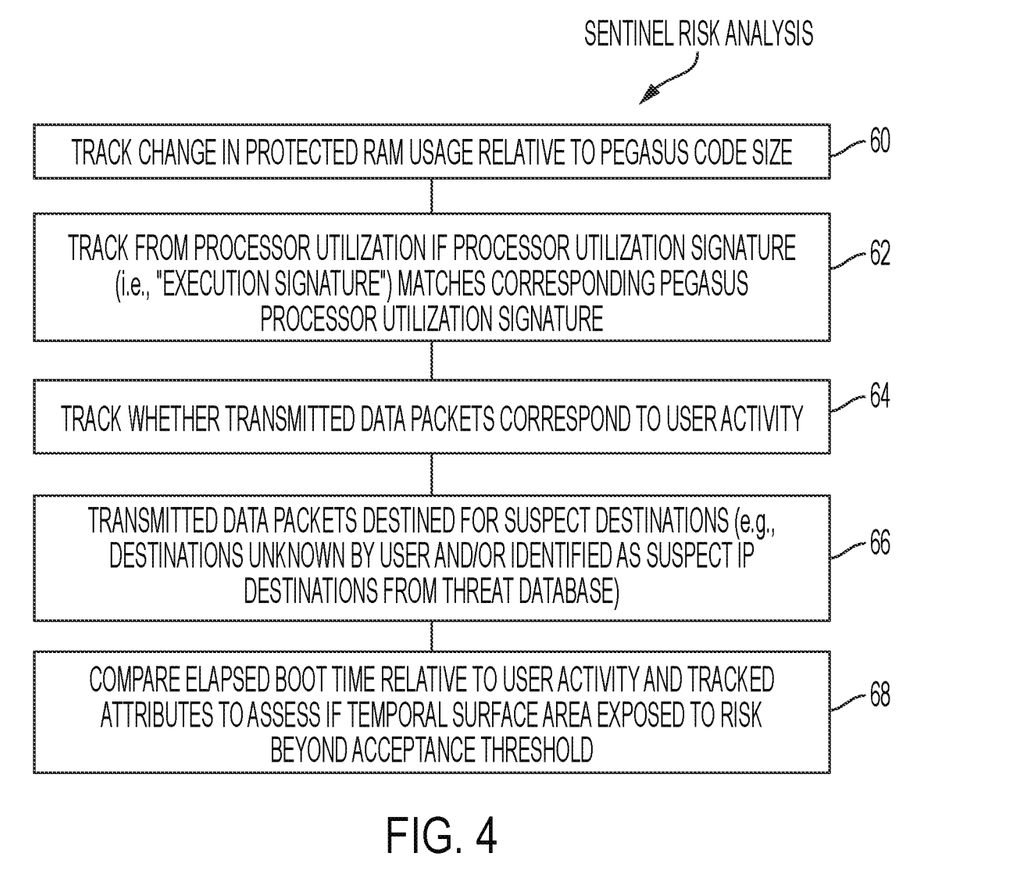
FIG. 4 illustrates an example method of determining a risk of the network device having been infected by a persistent consistent threat, according to an example embodiment.

FIG. 4 illustrates an example method of determining a risk of the network device having been infected by a persistent consistent threat, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only;

as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 3, the executable sentinel resource 12 can execute temporal-based threat detection to determine the risk of a persistent consistent threat (e.g., Pegasus) 18. In particular, the processor circuit 32 in operation 50 can instantiate the executable sentinel resource 12 based on retrieving, from the NVRAM 38, machine-readable executable code that when executed by the processor circuit 32 creates an executable instance of the executable sentinel resource 12 in the user portion 14. The executable sentinel resource 12 upon instantiation can monitor in operation 50 attributes associated with the network device 10, for example based on sending to the executable kernel 24 (via the MMU 22) a prescribed request (e.g., via an application programming interface (API)) for different attributes. Example attributes of the network device that can be detected by the executable sentinel resource 12 in operation 50 can include memory usage attributes associated with the volatile RAM 16, a processor utilization associated with the processor circuit 32, and/or attributes associated with transmitted data packets that are output by the device interface circuit 30.

An example attribute associated with the processor circuit 32 detected by the executable sentinel resource 12 in operation 50 is "boot time", i.e., the amount of time (defining a "temporal surface area") having elapsed since the last prior hard reset of the network device 10.

In particular, most UNIX-based operating systems (including IOS) have an "uptime" or "boot time", defined as the duration since a hard reset or "cold restart" of the operating system has been executed (resulting in a clearing or erasure of the volatile RAM 16). As described previously, infection of a network device 10 by a persistent consistent threat (e.g., Pegasus) 18 enables the persistent consistent threat (e.g., Pegasus) 18 to track user activity based on locally-generated data stored in the memory circuit 34, which can then be sent by the persistent consistent threat (e.g., Pegasus) 18 to an unauthorized destination. An increase in boot time increases a probability (risk) of infection by a persistent consistent threat (e.g., Pegasus) 18.

A particular issue regarding detectability by forensic tools (distinct from the spyware detection/AV software 26) is that the persistent consistent threat (e.g., Pegasus) 18 is removed from the network device 10 in response to execution of a hard reset or cold restart that clears the volatile RAM 16, thus removing the persistent consistent threat (e.g., Pegasus) 18 until subsequent re-infection (e.g., received via a messaging application). Hence, the persistent consistent threat (e.g., Pegasus) 18 is undetectable because forensic tools (e.g., a "debugger") require a computing device to be reset/rebooted before the forensic tools can begin detection operations, causing the persistent consistent threat (e.g., Pegasus) 18 to be removed from the computing device and therefore rendered undetectable by the forensic tools. However, absent any corrective action the persistent consistent threat (e.g., Pegasus) 18 can re-infect the network device 10 and resume spying activities.

Hence, the risk of infection of a persistent consistent threat (e.g., Pegasus) 18 can increase as the boot time increases: by way of illustration, execution of a hard reset every second could likely result in a network device 10 never being infected, whereas a hypothetical boot time approaching infinity would result in a near certainty that a network device 10 would be infected with a persistent consistent threat (e.g., Pegasus) 18.

Hence, the executable sentinel resource 12 in operation 52 can determine a relative risk (e.g., probability) that the network device 10 has been (or would be) infected by a persistent consistent threat (e.g., Pegasus) 18 in the protected RAM 20. Additional example details of determining the relative risk of infection is described below with respect to FIG. 4.

The executable sentinel resource 12 in operation 54 can compare the determined risk from operation 52 to various thresholds to determine whether to send a hard reset notification 40 for a hard reset. One threshold attribute that the executable sentinel resource 12 can apply to determine whether a hard reset should be executed include the relative sensitivity or concern of the user to avoid infections (e.g., very concerned, somewhat concerned, not very concerned, not at all concerned). Additional attributes can include an aging elapsed boot time (which increases the probability of infection), utilized applications (e.g., messaging applications known to transmit malware), user habits (e.g., visiting "hazardous" websites known to supply malicious code), unusual activity detected in the network device 10, etc.

If in operation 54 the executable sentinel resource 12 determines that the risk of infection is greater than a determined threshold (e.g., risk is greater than a ten percent (10%) threshold), for example based on a user sensitivity or "concern" about infection, aging elapsed boot time, utilized executable applications (e.g., high-risk vs. low-risk applications), detected unusual activity, etc.) the executable sentinel resource 12 in operation 56 can send a hard reset notification 40 to the user of the network device 10.

In particular, the executable sentinel resource 12 in operation 56 can send a hard reset notification 40 that recommends to the user of the network device 10 that the user executes a "hard" reset that causes the operating system/executable kernel 24 to restart and erase all data and executable code from the volatile RAM 16. The hard reset notification 40 can be sent to the local device display and/or keyboard 36 if the network device 10 is implemented as a user device (e.g., smart phone, smart tablet, desktop computer or laptop computer, etc.); the hard reset notification 40 also can be sent as an alert to a remote user device via a data network, for example in the case where the network device 10 is a router device, server device, etc., and the remote user device is a management device utilized by a user to manage the network device 10 (in this case, the "hard" reset could be implemented either remotely or if necessary by a person dispatched to the location of the network device 10 to execute the "hard" reset.

If desired (or if requested by the user), the executable sentinel resource 12 in operation 56 can specify in the hard reset notification 40 (or in a separate message) optional human-readable instructions advising the user on how to manually execute the "hard" reset, based on the device type.

A particular feature that distinguishes a "hard" reset from a "soft" reset is that during a "hard" reset the power supply is cutoff from the volatile RAM 16, causing a corruption of data in the volatile RAM 16 due to the power loss. Hence, during a "hard" reset during the boot process clears all bits of the volatile RAM 16 in order to remove random bits; a memory check also can be executed during the boot process to ensure that every bit of the volatile memory has been cleared, else a memory failure is detected and logged.

Hence, the "hard" reset can guarantee that all bits of the volatile RAM 16 are cleared (resulting in removal of the persistent consistent threat (e.g., Pegasus) 18 from the protected RAM 20), followed by a memory check to verify integrity of the volatile RAM 16. In contrast, a "soft" reset of a network device 10 does not interrupt the power supply to the volatile RAM 16, enabling the persistent consistent threat (e.g., Pegasus) 18 to remain stored in the protected RAM 20 during the "soft" reset or "soft" boot.

FIG. 4 illustrates an example method of determining a risk of the network device having been infected by a persistent consistent threat, i.e., the risk analysis that can be executed by the executable sentinel resource 12, according to an example embodiment.

The executable sentinel resource 12 also can ensure safe "at-rest" storage based on encrypting all monitored attributes, application state variables, and parameters generated by the executable sentinel resource 12 using a secure encryption key generated by the executable sentinel resource 12; hence, the executable sentinel resource 12 can encrypt all monitored boot configuration parameters and features in the host operating system to ensure the persistent consistent threat (e.g., Pegasus) 18 does not attempt to disable the executable sentinel resource 12. Example parameters and features that can be monitored by the executable sentinel resource 12 include: memory profile information; CPU profile information; disk access profile information (related to read/write access); network information (e.g., what type of data packets are transmitted at different points in time), etc.

Hence, the executable sentinel resource 12 in operation 60 can track changes in usage of the protected RAM 20, including detecting whether a change in memory usage in the persistent consistent threat (e.g., Pegasus) 18 corresponds to a determined size of executable code associated with the persistent consistent threat (e.g., Pegasus) 18 (identifiable from an available malware database). In other words, the detection of a new memory allocation in the protected RAM 20 having an allocation size corresponding to the size of the executable code of the persistent consistent threat (e.g., Pegasus) 18 can indicate a possible infection of a persistent consistent threat (e.g., Pegasus) 18 in the protected RAM 20, as opposed to other executable processes having relative sizes that can be determined by the processor circuit 32 upon retrieval from the NVRAM 38.

The executable sentinel resource 12 in operation 62 also can track utilization of the processor circuit 32 (i.e., processor utilization) to determine if a processor utilization signature (i.e., an execution signature) matches a corresponding execution signature of a known persistent consistent threat (e.g., Pegasus) 18 (identifiable from an available malware database). In particular, each executable instance has a distinct execution signature based on the sequence of executable code that is executed by the processor circuit 32 in runtime, including read/write operations, compute operations, etc.; hence, the executable sentinel resource 12 can determine if the execution signature matches a corresponding execution signature of a known persistent consistent threat (e.g., Pegasus) 18 to determine the probability of infection by a persistent consistent threat (e.g., Pegasus) 18.

The executable sentinel resource 12 in operation 64 also can track whether transmitted data packets output by the device interface circuit 30 correspond to user activity. For example, executable sentinel resource 12 in operation 64 can compare peripheral transmission activity (e.g., keyboard outputs, camera outputs, etc.) to data packet transmission activity in order to determine the relative "cadence" or correlation between peripheral device transmission activity and data packet transmission activity by the device interface circuit 30 to a remote destination. The executable sentinel resource 12 in operation 64 also can compare camera/microphone recording streams to determine whether there is data packet transmission activity by the device interface circuit 30, as opposed to local storage only in the NVRAM 38 (e.g., as a local media file) with relatively no transmission activity by the device interface circuit 30.

The executable sentinel resource 12 also can establish in operation 66 a destination profile for the destination addresses of the data packets output by the network device 10, where the executable sentinel resource 12 can encrypt and store the destination profile in an encrypted data structure to prevent the persistent consistent threat (e.g., Pegasus) 18 from attempting to manipulate the destination profile. For example, the executable sentinel resource 12 can identify "authorized" or "recognized" destination addresses (e.g., recognized web servers, recognized messaging servers, etc.) as opposed to unrecognized or suspect destination addresses (identifiable, for example, from an accessible threat database listing IP addresses of suspect destinations).

The executable sentinel resource 12 executed by the processor circuit 32 in operation 68 can apply each of the above-identified features (elapsed boot time, user activity, tracked attributes, etc.) to determine (e.g., using machine learning process) a risk factor for the probability that the network device has been infected by a persistent consistent threat (e.g., Pegasus) 18. Hence, the executable sentinel resource 12 in operation 68 can determine if the temporal surface area (e.g., elapsed boot time) has been exposed to risk of infection beyond an acceptance threshold based on user activity, tracked attributes, user sensitivity, etc. As described previously with respect to operation 56 of FIG. 3, the executable sentinel resource 12 can respond to the determined risk factor by sending to the user (e.g., a via a display alert) a hard reset notification 40 recommending the user execute a hard reset of the network device, for example based on the determined risk factor exceeding an identifiable risk threshold.

Hence, the executable sentinel resource 12 can track additional features to determine the likelihood of an infection by a persistent consistent threat (e.g., Pegasus) 18 for recommending a "hard" reset, including: tracking memory usage to determine if an amount of RAM has recently been used that corresponds to the size of the executable code for a persistent consistent threat (e.g., Pegasus) 18; tracking CPU utilization, including determining if a CPU utilization signature matches an identifiable execution signature by a persistent consistent threat (e.g., Pegasus) 18; tracking packet counts for transmitted packets (i.e., egress packets) initiated by the network device or associated peripheral devices, or unusual destinations for transmitted packets (where packet destinations can be compared with known IP address blocks of suspected spyware sites, etc. identified in an available database). As described previously, each of these attributes can be encrypted using an encryption key generated by the executable sentinel resource 12, for secure "at-rest" storage of the attributes and application state variables in use by the executable sentinel resource 12 and stored in the user portion 14 of the volatile RAM 16.

Hence, although the example embodiments (or any known technology) cannot prevent infection or reinfection by a potential persistent consistent threat (e.g., Pegasus) 18, the example embodiments can mitigate against such infections by sending, at determined intervals, a notification 40 recommending a user executes a "hard" reset of the network device. The presenting of a hard reset notification 40, in addition to removal of the persistent consistent threat (e.g., Pegasus) 18 based on the user executing a "hard" reset, also can induce the user to improve security operations to reduce the likelihood of subsequent infections of malware, including avoiding suspicious websites, removing suspect software or "apps", avoiding untrusted wireless networks, etc., without any modification of any existing device operating system software.

If desired, the executable sentinel resource 18 can be configured to send an alert 40 to the operating system (e.g., the executable kernel 24) via the MMU 22, enabling the executable kernel to initiate (based on a prior user preference selection) an automated "hard" reset (e.g., if the user has selected an "extremely sensitive" setting for responding to threats). Hence, additional options enable an automated "clearing" of the volatile RAM 16 (e.g., during idle intervals such as evenings) as needed to reduce temporal surface area relative to the determined risk.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   determining, by an executable resource within a network device, a risk of the network device having been infected by a persistent consistent threat based on the executable resource detecting attributes associated with the network device; and
   presenting based on the risk, by the executable resource, a recommendation to a user of the network device to execute a prescribed hard reset that erases all data and executable code from a volatile random access memory (RAM) of the network device, the prescribed hard reset causing erasure of any persistent consistent threat residing in the volatile RAM;
   wherein the determining of the risk includes determining an elapsed boot time of the network device relative to a prior hard reset.

2. The method of claim 1, wherein the determining includes detecting, as the attributes, one or more of a memory usage in the volatile RAM, a processor utilization, or transmitted data packets that are output by the network device.

3. The method of claim 2, wherein the determining further includes identifying, from the memory usage, whether a change in the memory usage corresponds to a determined size of executable code associated with the persistent consistent threat.

4. The method of claim 2, wherein the determining further includes identifying whether the processor utilization contains a processor utilization signature that matches a corresponding processor utilization signature of the persistent consistent threat.

5. The method of claim 2, wherein the determining further includes one or more of:
   determining whether the transmitted data packets output by the network device correspond to user activity of the network device; or
   determining whether at least a subset of the transmitted data packets are destined for network destinations identified as suspect by the executable resource.

6. The method of claim 1, wherein the presenting includes forwarding an alert containing the recommendation to a user device via a data network, the user device distinct from the network device.

7. The method of claim 1, wherein the presenting includes generating, with the recommendation, human-readable instructions for the user to execute the prescribed hard reset, based on the executable resource determining a device type for the network device.

8. One or more non-transitory tangible media encoded with logic for execution by a machine and when executed by the machine operable for:
   determining, by the machine implemented as a network device, a risk of the network device having been infected by a persistent consistent threat based on detecting attributes associated with the network device; and
   presenting, based on the risk, a recommendation to a user of the network device to execute a prescribed hard reset that erases all data and executable code from a volatile random access memory (RAM) of the network device, the prescribed hard reset causing erasure of any persistent consistent threat residing in the volatile RAM;
   wherein the determining of the risk includes determining an elapsed boot time of the network device relative to a prior hard reset.

9. The one or more non-transitory tangible media of claim 8, wherein the determining includes detecting, as the attributes, one or more of a memory usage in the volatile RAM, a processor utilization, or transmitted data packets output by the network device.

10. The one or more non-transitory tangible media of claim 9, wherein the determining further includes identifying, from the memory usage, whether a change in the memory usage corresponds to a determined size of executable code associated with the persistent consistent threat.

11. The one or more non-transitory tangible media of claim 9, wherein the determining further includes identifying whether the processor utilization contains a processor utilization signature that matches a corresponding processor utilization signature of the persistent consistent threat.

12. The one or more non-transitory tangible media of claim 9, wherein the determining further includes one or more of:
   determining whether the transmitted data packets output by the network device correspond to user activity of the network device; or
   determining whether at least a subset of the transmitted data packets are destined for network destinations identified as suspect.

13. The one or more non-transitory tangible media of claim 8, wherein the presenting includes forwarding an alert containing the recommendation to a user device via a data network, the user device distinct from the network device.

14. The one or more non-transitory tangible media of claim 8, wherein the presenting includes generating, with the recommendation, human-readable instructions for the user to execute the prescribed hard reset, based on determining a device type for the network device.

15. An apparatus implemented as a physical machine, the apparatus comprising:
   a volatile random access memory (RAM);
   non-transitory machine readable media configured for storing executable machine readable code;
   a device interface circuit configured for communications with a data network; and a processor circuit configured for executing the machine readable code, and when executing the machine readable code operable for:

determining a risk of the apparatus having been infected by a persistent consistent threat based on detecting attributes associated with the apparatus, and presenting, based on the risk, a recommendation to a user of the apparatus to execute a prescribed hard reset that erases all data and executable code from the volatile RAM, the prescribed hard reset causing erasure of any persistent consistent threat residing in the volatile RAM;

wherein the processor circuit is configured for determining the risk based on determining an elapsed boot time of the network device relative to a prior hard reset.

16. The apparatus of claim 15, wherein the processor circuit is configured for detecting, as the attributes, one or more of a memory usage in the volatile RAM, a processor utilization of the processor circuit, or transmitted data packets output by the device interface circuit.

17. The apparatus of claim 15, wherein the processor circuit is configured for generating, with the recommendation, human-readable instructions for the user to execute the prescribed hard reset, based on the processor circuit determining a device type for the apparatus.

* * * * *